United States Patent [19]
Ohtaka et al.

[11] Patent Number: 4,927,577
[45] Date of Patent: May 22, 1990

[54] PROCESS FOR FIRING CERAMIC HONEYCOMB STRUCTURAL BODIES

[75] Inventors: Masashi Ohtaka, Mie; Kazuhiro Miyahara, Nagoya City, both of Japan

[73] Assignee: NGK Insulators, Ltd., Japan

[21] Appl. No.: 158,670

[22] Filed: Feb. 22, 1988

[30] Foreign Application Priority Data

Feb. 27, 1987 [JP] Japan .................. 62-43178

[51] Int. Cl.[5] ............................. C04B 35/64
[52] U.S. Cl. ............................ 264/63; 264/64
[58] Field of Search ..................... 264/64, 63

[56] References Cited

U.S. PATENT DOCUMENTS 2,912,741  11/1959  Bennett .................. 264/64
3,111,397  11/1963  Metz ..................... 264/64

FOREIGN PATENT DOCUMENTS 2112318  7/1983  United Kingdom ........... 264/64

Primary Examiner—James Derrington
Attorney, Agent, or Firm—Arnold, White & Durkee

[57] ABSTRACT

A process for firing ceramic honeycomb structural bodies at a certain temperature in a given atmosphere is disclosed. The ceramic honeycomb structural bodies are fired, while a gas having a temperature equal to that of an atomsphere surrounding the exterior of the ceramic honeycomb structural bodies is forcedly passed through holes of the ceramic honeycomb structural bodies. By this firing process, a pore-forming agent and/or a shaping aid admixed in the ceramic honeycomb structural bodies can effectively be burnt away and the entire honeycomb structural bodies can uniformly be fired. Thus, fired ceramic honeycomb structural body having desired dimensions can be obtained in a shortened firing time.

1 Claim, 2 Drawing Sheets

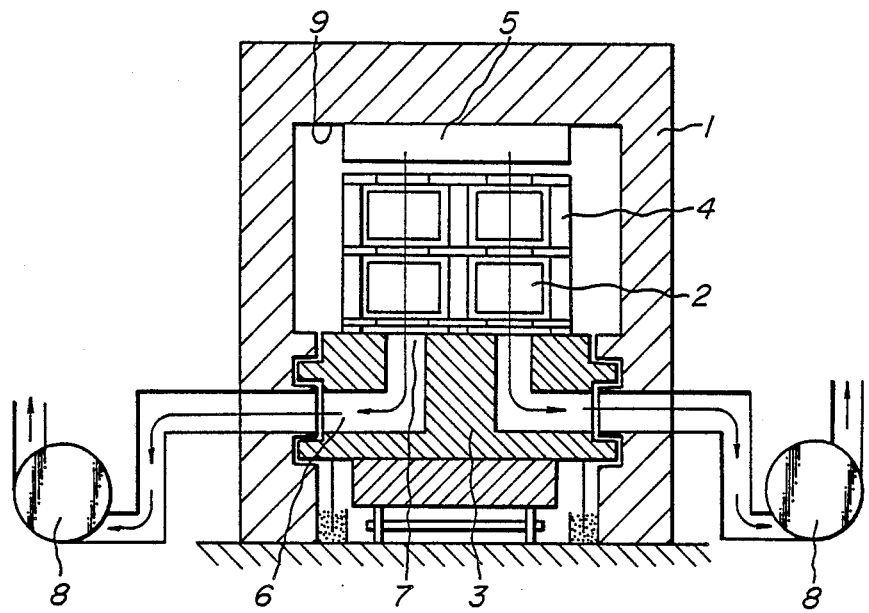
FIG_1
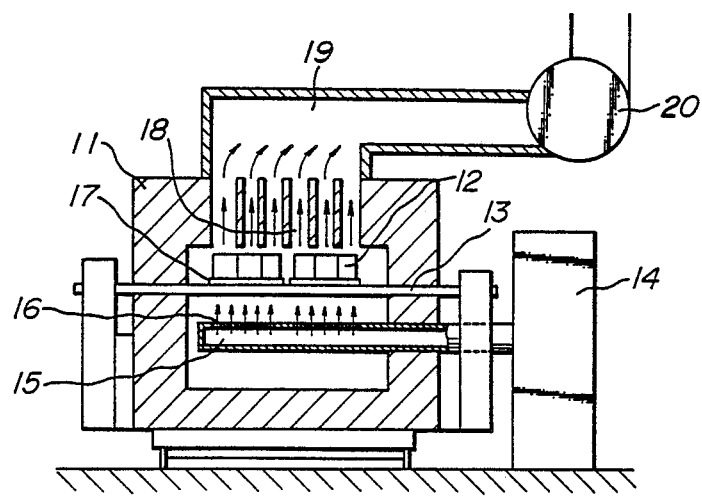
FIG_2

PROCESS FOR FIRING CERAMIC HONEYCOMB STRUCTURAL BODIES

BACKGROUND OF THE INVENTION (1) Field of the Invention

The present invention relates to a process for firing ceramic honeycomb structural bodies.

(2) Related Art Statement

Ceramic honeycomb structural bodies have been obtained by mixing a ceramic raw material and a shaping aid or a pore-forming agent, extruding the thus obtained ceramic bodies to form green ceramic honeycomb structural bodies, and firing the obtained green ceramic structural bodies at specific temperatures in a given atmosphere inside a tunnel kiln or periodic kiln.

Since honeycomb structural bodies contain air in a number of through holes thereof, it is difficult to effectively heat the honeycomb structural bodies from the exterior thereof in the case of firing them in tunnel kilns or periodic kilns, even if the honeycomb structural bodies are light. When the honeycomb structural bodies contain a shaping aid such as graphite, wheat powder or starch powder or a shaping aid, e.g., an organic binder such as methyl cellulose, carboxymethyl cellulose, polyvinyl alcohol, starch paste or glycerin, a surface active agent, wax, or the like, such a shaping aid and a pore-forming agent do not burn easily. Therefore, it takes a long time to completely burn them off. Further, a time period during which such a shaping aid or a pore-forming agent burns away differs between the inner and outer side portions of the honeycomb structural body. Thus, they are not burnt uniformly over the inside and outside portions of the honeycomb structural body. Accordingly, the honeycomb structural bodies do not uniformly shrink, and thus often; crack. In some cases, the ceramic honeycomb structural bodies obtained may have a nonuniform porosity or pore diameter between the inside and outside portions thereof. Further, since the honeycomb structural bodies are not uniformly heated over the inside and outside portions, the inner and outer portions of the honeycomb structural body do not uniformly shrink so that the honeycomb structural bodies are partially dimensionally changed or are deformed.

Moreover, since heat is trapped inside numerous through holes of the honeycomb structural bodies even during cooling during the production it is difficult to cool the honeycomb structural bodies from the exterior thereof, thus prolonging a cooling time period.

SUMMARY OF THE INVENTION

It is an object of the present invention to eliminate the above-mentioned problems, and to provide a process for firing ceramic honeycomb structural bodies, which permits production of ceramic honeycomb structural bodies suffering less cracks, nonuniform pores or nonuniform dimension, in a short time by uniformly firing and cooling the inner and outer portions of green honeycomb structural bodies.

The process for firing ceramic honeycomb structural bodies according to the present invention comprises firing green honeycomb structural bodies at specified temperatures in a given atmosphere, while a gas having the same temperature as that of an atmosphere surrounding the outside of the ceramic honeycomb structural bodies is forcedly passed through the through holes of the bodies.

In the above construction, since the heating atmosphere is forcedly passed through the inside of the honeycomb structural body during heating, a pore-forming agent, a shaping aid, and the like, existing in the inside portion of the honeycomb structural bodies can effectively be burnt and the entire honeycomb structural bodies can be uniformly heated. Thus, ceramic honeycomb structural bodies free from cracks with uniform pore distribution and excellent dimensional precision can be obtained in a short time by firing.

The flow rate of the surrounding atmosphere forcedly passed through the through holes of the honeycomb structural bodies is preferably in a range from 1.0 to 5.0 m/s, because if it is less than 1 m/s, no effect is obtained by passing the gas, while if it is more than 5.0 m/s, the honeycomb structural body is cooled too rapidly thus causing damage to heat efficiency.

These and other objects, features, and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1 through 3 are schematic views illustrating apparatuses suitably used for effecting the process for firing ceramic honeycomb structural bodies according to the present invention.

DETAILED DESCRIPTION OF THE INVENTION

Figure 3:
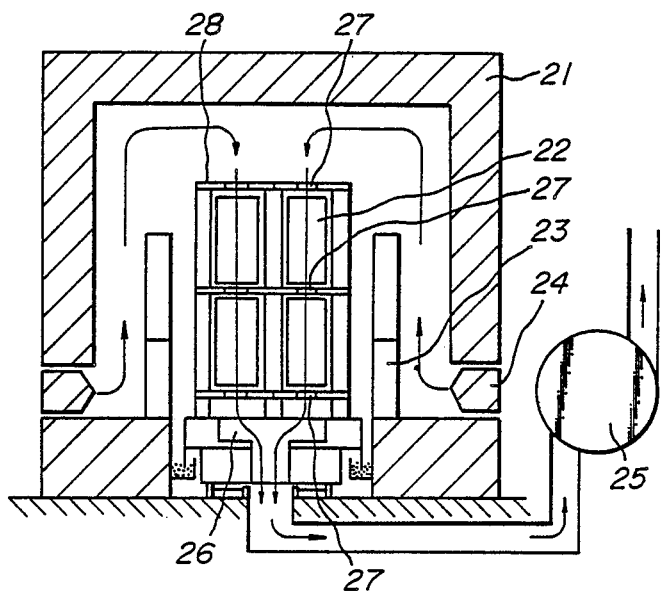

FIG. 1 shows a schematic view of an embodiment of an apparatus suitably used for effecting the invention process for firing ceramic honeycomb structural bodies while a gas is passed through the honeycomb structural bodies. In the embodiment of FIG. 1, a tunnel kiln is used as a kiln for firing ceramic honeycomb structural bodies. FIG. 1 shows a sectional view of a firing section of the tunnel kiln for effecting finish firing.

In FIG. 1, the inside of the tunnel kiln 1 is heated by a heater (not shown) such as a combustion burner, thereby firing green ceramic honeycomb structural bodies 2. That is, the ceramic honeycomb structural bodies 2 are placed, through shelves 4, on the upper side of a truck 3 movable inside the kiln, and are fired while being moved in the tunnel kiln 1. In the present invention, ventilating means 5 comprising a plurality of fans or the like is provided at a ceiling portion 9 in the kiln all over a preheating zone and a firing zone for heating and finally firing the ceramic honeycomb structural bodies 2, respectively. A heating gas suction openings 7 are provided in the central portion of the truck 3. Hot gas is always blown down toward the top portions of the honeycomb structural bodies 2 being transferred by the truck 3 by means of the fans 5 arranged at the kiln ceiling 9. On the other hand, heating gas is always sucked from the kiln ceiling portion through the heating gas suction openings 7 at the center portion of the truck 3 and heating gas suction paths 6 by means of heating gas evacuating fans 8. By so constructing, a surrounding atmosphere is always forcedly passed through honeycomb-fashioned through holes of the ceramic honeycomb structural bodies 2. At that time, an optimum flow rate at which the surrounding atmosphere passes through honeycomb structural bodies varies depending upon diameter, cell density, partition wall thickness, etc. of the ceramic honeycomb structural bodies to be fired. The flow rate is preferably in a range from 1.0 to 5.0 m/s.

In another embodiment shown in FIG. 2, a roller type hearth kiln 11 is used as a firing kiln for green ceramic honeycomb structural bodies. FIG. 2 illustrates a sectional view of a preheating zone for preheating the green honeycomb structural bodies 2 and burning away a shaping aid and a pore-forming agent inside the roller type hearth kiln.

In FIG. 2, the roller type hearth kiln 11 is heated by a heater (not shown) such as a combustion burner to fire green ceramic honeycomb structural bodies 12. That is, ceramic honeycomb structural bodies 12 are put on the upper faces of rotating rollers 13 through a perforated setter 17, and are fired while being transferred inside the roller type hearth kiln 11. In this embodiment, a plurality of hot gas-blowing ducts 15 and openings 18 are provided all over the preheating zone for preheating green ceramic honeycomb structural bodies at lower and upper portions inside the kiln, respectively. The ducts 15 have openings 16 opposed to the kiln ceiling. The openings 18 are located near upper faces of the honeycomb structural bodies 12 for sucking heating atmosphere. Hot gas is generated by a hot gas generator 14, and is always blown up from the under side of the honeycomb structural bodies through the ducts 15 at the lower portion inside the kiln and the hot gas blowing openings 16 while the honeycomb structural bodies are being transferred by rotating the rollers 13. On the other hand, the heating atmosphere contained inside cell through holes of the honeycomb structural bodies is always sucked by an evacuating fan 20 through the openings 18 at the upper portion inside the kiln and a heating atmosphere evacuating duct 19. By so constructing, surrounding atmosphere is forcedly passed through holes of honeycomb structural bodies for heating and firing.

When the honeycomb structural bodies are to be heated at high temperatures and a sufficient heating atmosphere cannot be produced by the hot gas generator 14 to heat the honeycomb structural bodies, combustion burners with nozzles opened toward the kiln ceiling may be provided at the lower portion of the kiln so that a combustion stream may pass through cell through holes of the honeycomb structural bodies 12.

Further, as in the case with the preheating zone, ducts and suction openings may be provided at lower and upper portions inside the kiln at a cooling zone of the roller hearth kiln 11, respectively. The ducts have openings opposed to the kiln ceiling. The suction openings derive heat from honeycomb structural bodies. By so constructing, cold gas is blown through the ducts at the lower portion of the kiln, and is sucked through the upper openings. Thereby, the cold gas is passed through the cell through holes of the honeycomb structural bodies.

FIG. 3 shows a sectional view of an embodiment of a periodic kiln 21 used as a firing kiln for ceramic honeycomb structural bodies 22.

In FIG. 3, a number of combustion burners 24 are provided at lower side walls of the periodic kiln 21 as heating means. Combustion streams from the combustion burners 24 are impinged upon flame baffles 23 arranged in front of the burners, and directed toward the upper portion in the kiln. The combustion streams are circulated like this and are available as a heating atmosphere. The combustion streams are then evacuated to the outside by suction force of an evacuating fan 25 through heating atmosphere evacuating holes 26 formed in a truck upon which ceramic honeycomb structural bodies 22 are placed while the combustion streams heat the honeycomb structural bodies on the truck when passing therethrough. In this embodiment, in order to forcedly pass the heating atmosphere through cell through holes of the ceramic honeycomb structural bodies 22, openings 27 which are commensurate with a sectional dimension of the ceramic honeycomb structural bodies are provided in shelf plates 28 on the truck upon which the honeycomb structural bodies are placed. By so constructing, heating atmosphere present over the kiln is passed through the cell through holes of the ceramic honeycomb structural bodies and evacuated to the outside of the kiln through the heating atmosphere evacuating opening 26 by suction force.

In the following, examples of the present invention will be explained.

EXAMPLE 1

Green ceramic honeycomb structural bodies containing a shaping aid were prepared, from cordierite, in a diameter and a length shown in Table 1, and fired in a roller hearth kiln according to the method of the present invention or by a conventional method. Times required for firing and cooling, etc. were compared with respect to those two methods. This is, Run Nos. 1 to 10 were prepared as invention products, in which a heating atmosphere-passing speed was varied during the firing. As Comparative Examples, Run Nos. 11 and 12 were prepared, through which a surrounding gas was not passed during the firing. Time during which the firing was completed, a temperature difference between upper and lower ends of a product during preheating, a dimensional difference between the upper and lower ends of the product after the firing, and a percentage of products of which end faces cracked were measured. Evaluations were made by the following criteria. That is, "O" denote products in which the dimensional difference between the upper and lower ends was not more than 1 mm and the percentage at which the ends faces cracked was 0%. "Δ" denotes products in which the dimensional difference was less than 1 mm and the percentage at which the end faces cracked was more than 0%. "x" denotes the products in which the dimensional difference was more than 1 mm and the percentage at which end faces cracked was over 0%. Results are shown in Table 1.

TABLE 1

| Sample No. | | Shape (mm) diameter | length | Speed of gas passing through sample product (m/s) | Total time period during which sample product enters and exits from kiln (hr) | | | Temperature difference between inside and outside of sample product during temperature rising in preheating (°C.) | Dimensional difference between upper and lower ends of sample product (mm) | Percentage of cut occurrence at end face (%) | Evaluation |
|---|---|---|---|---|---|---|---|---|---|---|---|
| | | | | | firing time | cooling time | total time period | | | | |
| Present | 1 | 100 | 100 | 0.5 | 40 | 13 | 53 | 50 | 0.8 | 10 | Δ |
| inven- | 2 | 150 | 120 | 0.5 | 50 | 18 | 68 | 70 | 1.0 | 15 | Δ |
| tion | 3 | 100 | 100 | 1.0 | 32 | 10 | 42 | 40 | 0.3 | 0 | O |
| | 4 | 150 | 120 | 1.0 | 45 | 15 | 60 | 65 | 0.7 | 0 | O |
| | 5 | 100 | 100 | 3.0 | 27 | 7 | 34 | 25 | 0.2 | 0 | O |
| | 6 | 150 | 120 | 3.0 | 40 | 13 | 53 | 50 | 0.3 | 0 | O |
| | 7 | 100 | 100 | 5.0 | 20 | 6 | 26 | 15 | 0.1 | 0 | O |
| | 8 | 150 | 120 | 5.0 | 35 | 10 | 45 | 30 | 0.2 | 0 | O |
| | 9 | 100 | 100 | 7.0 | 15 | 4 | 19 | 5 | 0.05 | 12 | Δ |
| | 10 | 150 | 120 | 7.0 | 30 | 8 | 38 | 15 | 0.1 | 17 | Δ |
| Compar- | 11 | 100 | 100 | — | 45 | 15 | 60 | 65 | 1.3 | 15 | X |
| ative Example | 12 | 150 | 120 | — | 55 | 20 | 75 | 85 | 1.7 | 25 | X |

In Run Nos. 1-10 of the present invention, the surrounding atmosphere was passed through the ceramic honeycomb structural bodies containing the shaping aid during the firing, while no surrounding atmosphere was passed through Run Nos. 11 and 12 as Comparative Examples. As is seen from the results in Table 1, in Run Nos. 1-10, the temperature difference and the dimensional difference between the upper and lower ends of the products became equal or smaller than conventional products even when the firing time was shortened, while the percentage at which the end faces cracked also decreased. Furthermore, it was seen that among the products of the present invention, the percentage at which the end faces cracked could be made smaller in Run Nos. 3 to 8 in which the speed of the firing atmosphere passing through the product during the firing was in a range from 1.0 to 5.0 m/s as compared with Run Nos. 1, 2 and 9 in which the passing speed was outside this range.

EXAMPLE 2

Green ceramic honeycomb structural bodies containing a pore-forming agent were prepared in a diameter and a length shown in Table 2, and fired according to the method of the present invention or by a conventional method with using a periodic kiln. Times required for firing and cooling, etc. were compared between those two methods. That is, Run Nos. 1-10 were prepared as invention products, in which a speed of passing a firing atmosphere through the products was varied during firing. As Comparative Examples, Run Nos. 11 and 12 were prepared, which were fired while no atmosphere was passed therethrough. A time period during which the firing was completed, a temperature difference between upper and lower ends of the product during preheating, a dimensional difference between the upper and lower ends of the product after the firing, and a percentage at which end faces of the products cracked were measured. Then, evaluations were effected in the following criteria. That is, "O" denotes products in which the dimensional difference between the upper and lower ends after the firing was not more than 1.5 mm and the percentage at which the end faces cracked was 0%. "Δ" denotes products in which the dimensional difference between the upper and lower ends was not more than 1.5 mm and end faces cracked. "x" denotes the products with unacceptable quality in which the dimensional difference between the upper and lower ends after the firing was more than 1.5 mm and end faces cracked. Results are shown in Table 2.

TABLE 2

| Sample No. | | Shape (mm) diameter | length | Speed of gas passing through sample product (m/s) | Total time period during which sample product enters and exits from kiln (hr) | | | Temperature difference between inside and outside of sample product during temperature rising in preheating (°C.) | Dimensional difference between upper and lower ends of sample product (mm) | Percentage of cut occurrence at end face (%) | Evaluation |
|---|---|---|---|---|---|---|---|---|---|---|---|
| | | | | | firing time | cooling time | total time period | | | | |
| Present | 1 | 230 | 300 | 0.5 | 88 | 20 | 108 | 63 | 0.8 | 10 | Δ |
| inven- | 2 | 300 | 350 | 0.5 | 99 | 25 | 124 | 80 | 1.5 | 15 | Δ |
| tion | 3 | 230 | 300 | 1.0 | 65 | 15 | 80 | 55 | 0.7 | 0 | O |
| | 4 | 300 | 350 | 1.0 | 100 | 20 | 120 | 70 | 1.2 | 0 | O |
| | 5 | 230 | 300 | 3.0 | 63 | 12 | 75 | 50 | 0.5 | 0 | O |
| | 6 | 300 | 350 | 3.0 | 83 | 17 | 100 | 60 | 1.0 | 0 | O |
| | 7 | 230 | 300 | 5.0 | 55 | 10 | 65 | 30 | 0.3 | 0 | O |
| | 8 | 300 | 350 | 5.0 | 75 | 15 | 90 | 55 | 0.6 | 0 | O |
| | 9 | 230 | 300 | 7.0 | 43 | 7 | 50 | 10 | 0.1 | 13 | Δ |
| | 10 | 300 | 350 | 7.0 | 68 | 12 | 80 | 45 | 0.3 | 15 | Δ |
| Compar- | 11 | 230 | 300 | — | 89 | 25 | 114 | 70 | 2.5 | 20 | X |
| ative Example | 12 | 300 | 350 | — | 100 | 30 | 130 | 100 | 3.8 | 30 | X |

As mentioned in the above, Run Nos. 1-10 of the present invention containing the pore-forming agent were fired while the surrounding atmosphere was passed therethrough. On the other hand, Run Nos. 11 and 12 were fired with no surrounding atmosphere being passed therethrough. As is seen from the results in Table 2, the temperature difference and the dimensional difference of the ceramic honeycomb structural bodies between the upper and lower ends both became equivalent to or smaller in Run Nos. 1-10 than those in run Nos. 11 and 12 even when the time for the firing was shortened, while the percentage at which end faces cracked was reduced.

Further, among the invention products, the percentage at which end faces cracked could be decreased in Run Nos. 3-8 in which the speed of passing the firing atmosphere through the products during the firing was in a range from 1.0 to 5.0 m/s as compared with Run Nos. 1, 2, 9 and 10 in which the passing speed was outside the above range.

As is clear from the above-detailed explanation, according to the process for firing ceramic honeycomb structural bodies in the present invention, the pore-forming agent, the shaping aid, etc. contained in the ceramic honeycomb structural bodies can effectively be burnt away and the honeycomb structural bodies can be heated uniformly by firing them while a heating atmosphere is forcedly passed through honeycomb-arranged through holes of the ceramic honeycomb structural bodies. Consequently, ceramic honeycomb structural bodies having desired dimensions can be obtained by firing them for a shortened time.

What is claimed is:

1. A process for firing ceramic honeycomb structural bodies containing a shaping aid and having a plurality of partition walls defining a plurality of through holes, comprising forcing passage of a firing atmosphere gas having a temperature equal to that of the firing atmosphere surrounding an exterior of the ceramic honeycomb structural bodies through the through holes of the ceramic honeycomb structural bodies at a speed of about 1.0-5 m/s, in order to heat said ceramic honeycomb structural bodies and thus uniformly burn and remove said shaping aid contained therein at inner and outer portions thereof.

* * * * *